United States Patent
Gasser et al.

(10) Patent No.: US 8,328,550 B2
(45) Date of Patent: Dec. 11, 2012

(54) METHOD AND DEVICE FOR USE OF ALTERNATIVE FUELS IN CLINKER AND CEMENT PRODUCTION

(75) Inventors: Urs Gasser, Rüfenach (CH); Edilberto L. Tadulan, PH-Taguig (PH)

(73) Assignee: Holcim Technology Ltd., Jona (CH)

( * ) Notice: Subject to any disclaimer, the term of this patent is extended or adjusted under 35 U.S.C. 154(b) by 996 days.

(21) Appl. No.: 11/990,218

(22) PCT Filed: Aug. 11, 2006

(86) PCT No.: PCT/IB2006/002194
§ 371 (c)(1),
(2), (4) Date: Nov. 20, 2008

(87) PCT Pub. No.: WO2007/017748
PCT Pub. Date: Feb. 15, 2007

(65) Prior Publication Data
US 2009/0283015 A1   Nov. 19, 2009

(30) Foreign Application Priority Data
Aug. 11, 2005   (AT) .................. A 1357/2005

(51) Int. Cl.
*F27B 15/08* (2006.01)
(52) U.S. Cl. .......................... 432/58; 432/14
(58) Field of Classification Search .......... 432/14, 432/58, 106
See application file for complete search history.

(56) References Cited

U.S. PATENT DOCUMENTS

| | | | |
|---|---|---|---|
| 4,295,823 A * | 10/1981 | Ogawa et al. | 432/106 |
| 4,392,353 A * | 7/1983 | Shibuya et al. | 60/657 |
| 4,640,681 A | 2/1987 | Steinbiss et al. | |
| 4,645,452 A | 2/1987 | Henan et al. | |
| 5,098,285 A * | 3/1992 | Bauer | 432/14 |
| 5,370,067 A | 12/1994 | Finet | |
| 5,816,795 A * | 10/1998 | Hansen et al. | 432/14 |
| 5,989,017 A * | 11/1999 | Evans | 432/14 |
| 6,210,154 B1 * | 4/2001 | Evans et al. | 432/106 |
| 6,345,981 B1 * | 2/2002 | Hansen et al. | 432/106 |
| 6,626,662 B2 | 9/2003 | Ramesohl et al. | |
| 6,773,259 B1 * | 8/2004 | Bech et al. | 432/14 |
| 8,021,479 B2 * | 9/2011 | Mohr et al. | 106/739 |

(Continued)

FOREIGN PATENT DOCUMENTS
DE   33 30 667 A1   3/1985
(Continued)

*Primary Examiner* — Gregory A Wilson
(74) *Attorney, Agent, or Firm* — Chapman and Cutler LLP

(57) ABSTRACT

In a method for utilizing alternative fuels in the production of clinker or cement the alternative fuels are employed in reactors (4) for the preheating and/or precalcining of raw meal in a combustion device (17) separate from the burners (12) of the respective reactor (4) and are at least partially burnt whereupon an, if necessary, complete combustion is carried out inside the reactors (4) with the combustion oxygen fed to the burner (12) of the reactor (4) in excess of stoichiometry. The device for utilizing alternative fuels in the production of clinker or cement having a clinker kiln (1) and a reactor (4) with burners (12) for preheating and calcining of raw meal and having at least one duct (18) for combustion air or -oxygen respectively is characterized in that a separate combustion device (17) having a conveyor for alternative fuels such as, for instance, a pusher or a screw conveyor (16) is provided and opens inside the respective reactor (4).

13 Claims, 1 Drawing Sheet

U.S. PATENT DOCUMENTS

2003/0150161 A1 * 8/2003 Garcia-Segovia et al. ... 48/62 R

FOREIGN PATENT DOCUMENTS

| DE | 43 03 170 A1 | 8/1994 |
| EP | 0 582 394 A1 | 2/1994 |
| EP | 0 764 614 A2 | 3/1997 |
| EP | 1 334 954 A1 | 8/2003 |

* cited by examiner

METHOD AND DEVICE FOR USE OF ALTERNATIVE FUELS IN CLINKER AND CEMENT PRODUCTION

BACKGROUND OF THE INVENTION

The invention relates to a method and a device for utilizing alternative fuels in the production of clinker or cement.

Alternative fuels, as a rule, contain a number of elements whose combustion give rise to products, which can only be eliminated from the stream of exhaust gas by sumptuous steps of purification. Such products of combustion, such as for example sulfurdioxide can, however, risklessly be incorporated into the final product in the course of the production of clinker and cement so that along with the utilization of inferior fuels also the riskless disposition of products of combustion being troublesome in a conventional combustion is achieved at the same time. Alternative fuels, for instance formed by organic wastes, however, are characterized by a lower calorific value as compared to high value fuels. Temperatures of about 2000° C. have to be achieved by burners as employed for the heating of the rotary kiln in the production of clinker, whereby this is only achieved by using high value fuels such as gaseous or liquid fuels as well as, as the case may be, by using coal dust burners. Such burners have already been devised for the additional use of a portion of alternative fuels. Because of the relatively lower calorific value, these additions of fuels in the main burners of the clinker kiln result in many cases in an incomplete combustion and in perturbation of the flame of the actual high temperature burner. Compared to high value fuels, alternative fuels demand for a considerably longer holding time in the oxidizing atmosphere of the burner in order to safeguard complete combustion. Such a holding time cannot be ensured offhand at higher flow rates.

A substantial portion of the energy employed in the course of the production of clinker and cement is used for the calcining of the raw meal. The calcining is effected at substantially lower temperatures as compared to the clinker temperatures and, as a rule, is completely feasible at temperatures of about 850° C. The use of inferior and in particular of alternative fuels in connection with such a comparatively low temperature-level is theoretically conceivable. It is, however, problematic that in precalciners using the hot combustion gases of the clinker kiln such flow rates are prevailing that a sufficiently long holding or retention time respectively is ensured for the raw meal to be heated and being carried along afloat in the gas, but is not ensured for the complete combustion of lumpy alternative fuels.

BRIEF SUMMARY OF THE INVENTION

It is hence an object of the invention to provide a method for utilizing alternative fuels in the production of clinker or cement, in which such alternative fuels can risklessly be employed in particular with preheaters or precalciners respectively, whereby it is in particular to be ensured that an appropriate holding time for the desired conversion is safeguarded also in the case of lumpy fuel. To solve this object, the inventive method generally consists in that the alternative fuels are employed in reactors for the preheating and/or precalcining of raw meal in a combustion device separate from the burners of the respective reactors and are at least partially burnt, whereupon an, if necessary, complete combustion is carried out inside the reactors with the combustion oxygen fed to the burner of the reactor in excess of stoichiometry. In precalciners or preheaters, in the majority of cases, burners for example for petroleum coke or other fuels such as petroleum gas or petroleum are provided, which assure an appropriately quick combustion also at higher flow rates together with the tertiary air being introduced in such a reactor and hence provide for an appropriate heating for the precalcining of the raw meal. By providing a separate combustion device for the alternative fuels, for which a longer holding time in the atmosphere of the preheater or precalciner is required, the combustion device can be adapted to the respective requirements of the alternative fuel, whereby an appropriate holding time and in particular also the appropriate oxygen demand for an at least partial combustion at high temperatures can separately be adjusted and a product being already at least partially combusted can be ejected into the reactor, which product, in the following can be converted during the relatively short time being available in parallel to the raw meal to the calcined raw meal kept afloat. A number of gaseous combustion products, which are not to be ejected directly into the atmosphere can be absorbed or chemically bonded by the hot raw meal on this occasion so that with the utilization of the energy from the combustion also appropriate purification of the combustion off gases can be effected at the same time, which can lead to the pollutant-free emission of combustion products of alternative fuels. Combustion residues reach the clinker kiln along with the raw meal and can there be mineralized.

The inventive device for utilizing alternative fuels in the production of clinker or cement comprises a clinker kiln and a reactor with burners for preheating and calcining of raw meal. As a rule, ducts for combustion air or -oxygen respectively in the form of a duct for tertiary air are joint to such a reactor, wherein in most of the cases preheated combustion air is employed. The feed of tertiary air, as a rule, is effected to an extent, which corresponds to the calculated stoichiometric amount for the combustion of the fuel employed in the burners plus a little excess. According to the invention, the device is devised such that a separate combustion device having a conveyor for alternative fuels such as, for instance, a pusher or a screw conveyor is provided and opens inside the respective reactor. Alternative fuels, as can be employed according to the invention, as a rule, are characterized by coarseness, lumpiness and a relatively high degree of agglomeration, whereby such fuels cannot be burnt offhand with conventional burners for the time required for combustion is not available. By the separate combustion device having a conveyor for such alternative fuels, this fuels can be guided into a combustion chamber or a combustion platform respectively to the desired extent and can there be heated and pre-converted during the exact time needed for safeguarding that at further induction or conveying of alternative fuels only the product of the alternative fuels being already at least partially burnt are discharged into the turbulent stream inside the precalciner. In addition, the discharge of such products can increase turbulence thereby further improving the holding time, whereby an accordingly improved yield of energy is also achieved for the other fuels provided to the burners. Advantageously, the inventive embodiment is devised such that the separate combustion device is connected with separate ducts for combustion air or ducts for oxygen respectively. In doing so, different alternative fuels and different holding times can be addressed in an optimal manner, whereby, above all, it can be safeguarded that the desired degree of the at least partial combustion of the alternative fuels is achieved before they are injected into the stream of hot gases of the precalciner.

In a particularly simple manner, the embodiment can hereby be devised such that the separate combustion device is formed as a chamber being open-ended and reaching into the respective reactor, whose base and/or wall has through holes for connections for combustion oxygen, whereby the base of the separate combustion device advantageously reaches into the interior of the preheater and/or calcinator in the form of a shovel. Considering the fact, that such reactors as employed for preheating and/or precalcining are mostly formed in the shape of a tube or shaped cylindrically respectively the embodiment can advantageously also be devised such that the base of the separate combustion device is formed ring-shaped whereby preferably a plurality of combustion devices reaching into the reactor or precalciner respectively is distributedly arranged in the circumferential direction and/or the direction of height of the reactor. By all these measures, different alternative fuels can be addressed in a particularly simple manner, whereby it is even feasible to employ different alternative fuels in different levels of the reactor in order to provide a wide spectrum of possibilities of disposition of alternative fuels, which cannot be used for other purposes.

BRIEF DESCRIPTION OF THE SEVERAL VIEWS OF THE DRAWINGS

In the following, the invention will be described in more detail by way of an exemplary embodiment schematically depicted in the drawing. In this

DETAILED DESCRIPTION OF THE INVENTION

Figure 1:
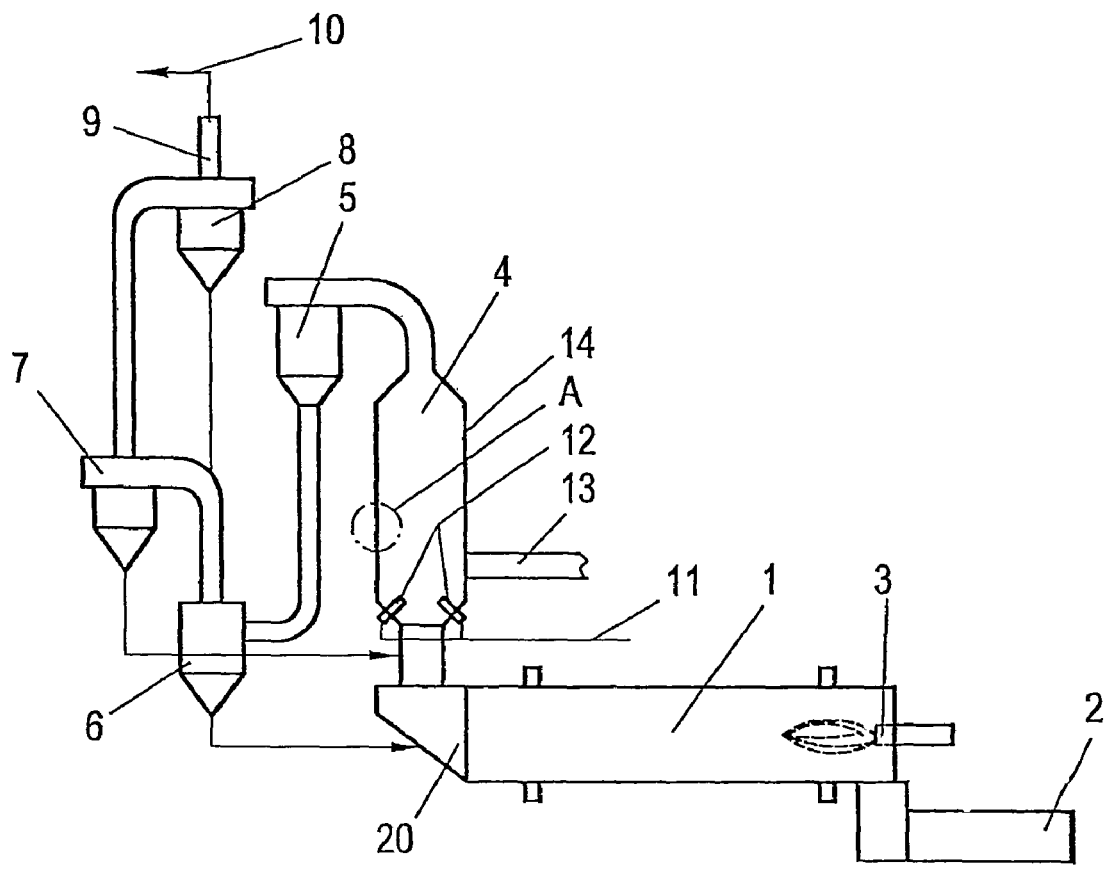
FIG. 1 shows a schematic partial view of a clinker kiln having upstream aggregates such as preheaters and precalciners and FIG. 2 a detail of a precalciner wherein the depiction in FIG. 2 shows an enlarged view of the area A of FIG. 1.

In FIG. 1, a clinker kiln is denoted by 1, at whose end neighboring the clinker cooler 2 a burner 3 can be seen. In the rotary kiln the gas temperature drops from 1500 to at about 900° C. at the feed end 20 of the rotary kiln 1 whereby the hottest temperatures are reached near the burner 3 and can partially be beyond 2000° C. The gases being drawn of in a hot state at the feed end 20 pass through a precalciner 4, come into a swirl chamber 5 and subsequently into a series of cyclone/fluidized bed preheaters 6, 7 and 8 before they are drawn off via duct 9 according to arrow 10 by means of a fan. Fuel is provided to the precalciner 4 via conducts 11 to nozzles 12, whereby the air required for the combustion is brought in via a connection for tertiary air 13. The material to be calcined is kept afloat in the precalciner 4, whereby velocities of the gas stream of more than 10 m/sec are not uncommon. The fuel which is supplied to the nozzles 12 has to combusted appropriately quick in order to become effective during the short holding time in the interior of the precalciner, whereby here for example coal dust and in particular petroleum coke are possible as fuel. Of course, high-value fuels such as petroleum gas and petroleum can equally be combusted.

Figure 2:
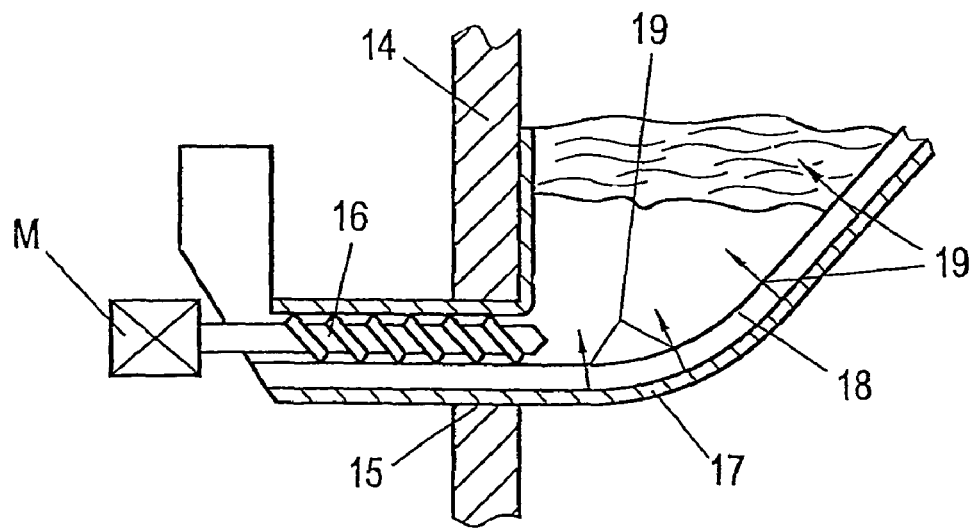

The partial area A in the wall 14 of the precalciner 4 is enlargedly depicted in FIG. 2. The wall features a through hole 15, through which a screw conveyor 16 is guided. The screw conveyor 16 is arranged inside a combustion chamber 17 in the form of a shovel, whereby the drive of the screw conveyor 16 is schematically denoted with M. The combustion chamber 17 has a separate supply 18 for combustion air and appropriate nozzles 19, by means of which combustion air is injected into the combustion chamber 17. The conveyor is adapted to bring relatively lumpy alternative fuel into the combustion chamber 17 at the desired speed, whereby the holding time in the combustion chamber 17 only depends on the flow velocity of the gases axially neighboring the combustion chamber 17. The alternative fuel can be retained during the desired time until it has reached the extent of the desired partial combustion as a result of the high temperature prevailing and the applied oxygen calculated for the respective alternative fuel, so that, by further induction of alternative fuel by means of the screw conveyor 16, it can be discharged over the rim of the combustion chamber 17 into the area near the axis of the precalciner 4. In this region, the alternative fuel is entrained by the hot combustion gases of the other burners, and the rotary kiln 1 wherein a certain degree of turbulence can be achieved, whereby the holding time can again be slightly extended.

The alternative fuel as well as the primary fuel, which is supplied via the nozzles 12, can hence be more or less completely be combusted before leaving the precalciner so that temperatures of 850 to 900° C. can be achieved at this point, which temperatures are sufficient for a more or less complete conversion of $CaCO_3$ to $CaO$ and $CO_2$. According to the alternative fuel such a combustion chamber 17 can be arranged in a different axial height of the precalciner 4 and in different positions along the circumference of the precalciner 4 so that a mode of operation optimally adapted to the respective alternative fuel is feasible with simultaneously different conveying speed for the respective alternative fuel and with different supply of oxygen of the respective combustion chambers 17. This device, in particular, is adapted to combust semi-fine to semi-coarse material as well as thixotrope alternative fuels, whereby the lower maximal level of temperature that can be achieved due to the lower heat value suffices for the desired purpose namely the precalcing.

A precalciner, as a rule, consumes up to 60% of the overall thermal energy-demand of a cement clinker plant, whereby the use of inferior alternative fuels with a correspondingly high portion of ashes or incombustible or unburnt portion at this stage of the procedure is unproblematic not least for the reason that such residues can come into the cement clinker kiln 1 and can there be mineralized. Overall it is achieved to ensure the substantially longer holding time required for such alternative fuels for a reasonable combustion and to bring in such fuels in the desired dosage, whereby supplementary modifications to existing plants go along only with relatively unimportant constructive effort.

The invention claimed is:

1. Method for utilizing alternative fuels in production of clinker or cement, comprising the step of:
   providing a combustion device (17) that is positioned inside a reactor (4) for one or more of preheating and precalcining of raw meal, said combustion device (17) being separate from a burner (12) of the reactor (4), said combustion device comprising a chamber positioned so as to reach into the reactor (4), said chamber having an opening on its upper end with a rim,
   feeding alternative fuels into the chamber by means of a screw conveyor (16) arranged at a bottom of said chamber,
   injecting combustion air or combustion oxygen into the chamber,
   at least partially combusting the alternative fuels in the combustion device (17), and
   further feeding alternative fuels into the chamber by means of the screw conveyor (16) thereby discharging the at least partially combusted alternative fuels over the rim of the chamber into the reactor (4).

2. Method according to claim 1, further comprising the step of carrying out complete combustion of the alternative fuels inside the reactor (4) with combustion oxygen fed to the burner (12) of the reactor (4) in excess of stoichiometry.

3. Device for utilizing alternative fuels in production of clinker or cement, comprising:
   a clinker kiln (1), and
   a reactor (4) for one or more of preheating and calcining of raw meal,
   the reactor (4) comprising at least one burner (12), and at least one duct (13) for combustion air or combustion oxygen,
   wherein
   a separate combustion device (17) for alternative fuels is arranged at least partially inside the reactor (4),
   said combustion device comprises a chamber positioned so as to reach into the reactor (4), said chamber having a discharge opening on its upper end for discharging at least partially combusted alternative fuels from the chamber into the reactor (4),
   a screw conveyor (16) is arranged at a bottom of said chamber, and
   the separate combustion device (17) is connected with separate ducts (18) for combustion air or combustion oxygen.

4. Device according to claim 3, wherein
   the separate combustion device (17) is an open-ended chamber positioned so as to reach into the reactor (4), and
   the reactor (4) comprises one or more of a base and a wall comprising through holes (15) for receiving connections (19) for supply of combustion air or combustion oxygen.

5. Device according to claim 4, wherein a base of the separate combustion device (17) is positioned so as to reach into an interior of the reactor (4), and is formed as a shovel.

6. Device according to claim 4, wherein a base of the separate combustion device (17) is positioned so as to reach into an interior of the reactor (4), and is formed in a ring shape.

7. Device according to claim 4, wherein a plurality of separate combustion devices (17) are positioned so as to reach into the reactor (4), and are distributedly arranged in one or more of:
   a circumferential direction around the reactor (4); and
   a direction of height of the reactor (4).

8. Device according to claim 3, wherein a base of the separate combustion device (17) is positioned so as to reach into an interior of the reactor (4), and is formed as a shovel.

9. Device according to claim 8, wherein a base of the separate combustion device (17) is positioned so as to reach into an interior of the reactor (4), and is formed in a ring shape.

10. Device according to claim 8, wherein a plurality of separate combustion devices (17) are positioned so as to reach into the reactor (4), and are distributedly arranged in one or more of:
    a circumferential direction around the reactor (4); and
    a direction of height of the reactor (4).

11. Device according to claim 3, wherein a base of the separate combustion device (17) is positioned so as to reach into an interior of the reactor (4), and is formed in a ring shape.

12. Device according to claim 11, wherein a plurality of separate combustion devices (17) are positioned so as to reach into the reactor (4), and are distributedly arranged in one or more of:
    a circumferential direction around the reactor (4); and
    a direction of height of the reactor (4).

13. Device according to claim 3, wherein a plurality of separate combustion devices (17) are positioned so as to reach into the reactor (4), and are distributedly arranged in one or more of:
    a circumferential direction around the reactor (4); and
    a direction of height of the reactor (4).

* * * * *